(12) United States Patent
McClure et al.

(10) Patent No.: US 9,366,422 B2
(45) Date of Patent: Jun. 14, 2016

(54) SLOTTED HEATSINKS AND SYSTEMS AND METHODS RELATED THERETO

(71) Applicant: MAKERSLED LLC, Ames, IA (US)

(72) Inventors: Mark D. McClure, Ames, IA (US); Andrew J. McClure, Ames, IA (US)

(73) Assignee: MAKERSLED LLC, Ames, IA (US)

( * ) Notice: Subject to any disclaimer, the term of this patent is extended or adjusted under 35 U.S.C. 154(b) by 295 days.

(21) Appl. No.: 14/061,963

(22) Filed: Oct. 24, 2013

(65) Prior Publication Data

US 2014/0049964 A1  Feb. 20, 2014

Related U.S. Application Data

(63) Continuation-in-part of application No. 29/416,452, filed on Mar. 22, 2012, now Pat. No. Des. 717,986.

(60) Provisional application No. 61/718,145, filed on Oct. 24, 2012.

(51) Int. Cl.
| | | |
|---|---|---|
| *F21V 29/00* | (2015.01) | |
| *B23P 15/26* | (2006.01) | |
| *F28F 3/02* | (2006.01) | |

(Continued)

(52) U.S. Cl.
CPC ............ *F21V 29/2212* (2013.01); *B23P 15/26* (2013.01); *F21V 19/0055* (2013.01); *F21V 29/02* (2013.01); *F21V 29/763* (2015.01); *F28F 3/02* (2013.01); *F21W 2131/308* (2013.01); *F21Y 2101/02* (2013.01); *F21Y 2105/001* (2013.01); *F28F 3/048* (2013.01); *F28F 2275/20* (2013.01); *Y10T 29/4935* (2015.01)

(58) Field of Classification Search
CPC ......... F21V 29/70; F21V 29/74; F21V 29/75; F21V 29/76; F21V 29/763; F16B 37/044; F16B 37/045; F16B 37/047
See application file for complete search history.

(56) References Cited

U.S. PATENT DOCUMENTS

| | | |
|---|---|---|
| 3,725,634 A | 4/1973 | Lane |
| 5,654,876 A | 8/1997 | Sathe et al. |

(Continued)

FOREIGN PATENT DOCUMENTS

| | | |
|---|---|---|
| WO | 2011/041626 A1 | 4/2011 |
| WO | 2012/178198 A2 | 12/2012 |

(Continued)

OTHER PUBLICATIONS

Notice of Allowance received for U.S. Appl. No. 29/416,452, mailed on Aug. 20, 2014, 7 pages.

(Continued)

*Primary Examiner* — Sean Gramling
*Assistant Examiner* — Gerald J Sufleta, II

(57) ABSTRACT

Slotted heatsinks comprise a base containing a plurality of slots adapted to removably secure light emitting devices, wherein each of said slots comprises at least four cavities; and a plurality of fins adjacent to and/or on top of said slots for removing heat generated by the light emitting devices. The slots may have a t-shaped or +-shaped cross section. Opposing sidewalls may also be provided together with one or more active cooling devices and various covers for the components. Related systems and methods are also provided. When combined with a suitable light source, such devices are useful for a wide range of applications, including, for example, as aquarium or grow lights.

27 Claims, 15 Drawing Sheets

(51) Int. Cl.

| | | |
|---|---|---|
| *F21V 29/02* | (2006.01) | |
| *F21V 19/00* | (2006.01) | |
| *F21V 29/76* | (2015.01) | |
| F21W 131/308 | (2006.01) | |
| F21Y 101/02 | (2006.01) | |
| F21Y 105/00 | (2016.01) | |
| F28F 3/04 | (2006.01) | |

(56) References Cited

U.S. PATENT DOCUMENTS

| | | |
|---|---|---|
| 5,787,971 A | 8/1998 | Dodson |
| 6,269,003 B1 | 7/2001 | Wen-Chen |
| 6,789,609 B2 | 9/2004 | Tsai et al. |
| 7,513,659 B2 | 4/2009 | Vukosic et al. |
| D592,785 S | 5/2009 | Bisberg et al. |
| D592,786 S | 5/2009 | Bisberg et al. |
| 7,694,718 B2 | 4/2010 | Lai et al. |
| 7,854,527 B2 | 12/2010 | Anderson |
| 7,869,213 B2 | 1/2011 | Chen et al. |
| D632,418 S | 2/2011 | Bisberg et al. |
| 7,891,847 B2 | 2/2011 | Vukosic et al. |
| 8,330,362 B2 | 12/2012 | Lin |
| 8,403,533 B1 | 3/2013 | Paulsel |
| 8,408,734 B2 | 4/2013 | Wu et al. |
| D717,986 S | 11/2014 | McClure et al. |
| 2002/0131236 A1 | 9/2002 | Lin |
| 2004/0040700 A1 | 3/2004 | Tsai et al. |
| 2006/0255359 A1 | 11/2006 | Sun et al. |
| 2009/0116224 A1 | 5/2009 | Crabb et al. |
| 2010/0132918 A1 | 6/2010 | Lin |
| 2010/0193158 A1 | 8/2010 | Lin |
| 2010/0214770 A1 | 8/2010 | Anderson |
| 2010/0276410 A1 | 11/2010 | Hudson et al. |
| 2011/0002120 A1* | 1/2011 | Song ................. F21S 2/005 362/249.02 |
| 2011/0067836 A1 | 3/2011 | Tang et al. |
| 2011/0155363 A1 | 6/2011 | Hsieh |
| 2011/0175511 A1 | 7/2011 | Lai |
| 2011/0175512 A1 | 7/2011 | Lai |
| 2011/0197598 A1 | 8/2011 | Cheng et al. |
| 2011/0280011 A1 | 11/2011 | Crabb et al. |
| 2012/0063088 A1 | 3/2012 | Fu et al. |
| 2012/0114500 A1 | 5/2012 | Ye |
| 2012/0241135 A1 | 9/2012 | Takigawa et al. |
| 2012/0307501 A1 | 12/2012 | Tankala et al. |
| 2012/0314430 A1 | 12/2012 | McCanless |
| 2013/0094225 A1 | 4/2013 | Leichner |
| 2013/0107525 A1* | 5/2013 | Woodgate ................. F21K 9/00 362/237 |
| 2013/0133710 A1 | 5/2013 | Ludwig |
| 2013/0220582 A1 | 8/2013 | Eriksen |
| 2013/0239475 A1 | 9/2013 | Crabb et al. |
| 2013/0279159 A1* | 10/2013 | Pickard ................. F21V 29/505 362/218 |
| 2014/0192537 A1* | 7/2014 | Chung ................. F28F 3/02 362/294 |
| 2014/0248103 A1* | 9/2014 | Baldsiefen ............ B60P 7/0815 410/104 |

FOREIGN PATENT DOCUMENTS

| | | |
|---|---|---|
| WO | 2013/059298 A1 | 4/2013 |
| WO | 2013/070429 A1 | 5/2013 |
| WO | 2013/090536 A1 | 6/2013 |

OTHER PUBLICATIONS

*Ex Parte Quayle* Action received for U.S. Appl. No. 29/416,452, mailed on Dec. 19, 2013, 8 pages.

"8.460" LED T-Slots", Extruded Aluminum Heatsink with T-Slots, Document available at: http://www.heatsinkusa.com/8-460-led-t-slots/, Retrieved on Jan. 30, 2013, 2 pages.

Adams, Jake, "MakersLED Aims to Bring More Performance and Features to DIY LED Kits", published: Nov. 14, 2011, Document available at: http://reefbuilders.com/2011/11/14/makersled-bring-performance-diy-led-kits/, Reef Builders, Retrieved on Nov. 26, 2013, 3 pages.

Bentley, Clive, "Hands on with the MakersLED DIY Heatsink & Fixture", published: Aug. 27, 2012, Document available at: http://reefbuilders.com/2012/08/27/hands-makersled-diy-heatsink/, Reef Builders, Retrieved on Nov. 26, 2013, 6 pages.

MakersLED, "Products", published: May 26, 2013, Document available at: http://makersled.com/?page_id=335, Retrieved on Nov. 26, 2013, 2 pages.

McClure, Andy, "MakersLED Heatsink for High Power Star LEDs", [Video File], published: Mar. 7, 2012, Retrieved from: http://www.youtube.com/watch?v=ShzNvYljRDI&feature=player_embedded, on Nov. 26, 2013, 2 pages.

\* cited by examiner

1007A

1007B

1007C ically perpendicular to and contiguous with two additional linearly aligned cavities. Each of the four cavities can be of substantially the same length (and/or width) or can have varying lengths and/or widths.

SLOTTED HEATSINKS AND SYSTEMS AND METHODS RELATED THERETO

This application claims the benefit under 35 U.S.C. 119(e) of U.S. Provisional Application Serial No. 61/718,145, filed on Oct. 24, 2012, which is hereby incorporated by reference herein in its entirety. This application is also a continuation-in-part of U.S. patent application Serial No. 29/416,452, filed on Mar. 22, 2012, which issued as U.S. Pat. No. D717,986 on Nov. 18, 2014, which application and patent are also hereby incorporated by reference in their entireties.

BACKGROUND

Heatsinks are used to mount light emitting devices, which are used to illuminate a desired area using a desired spectrum or color mix. Heatsinks also keep light emitting devices within a safe operating temperature.

SUMMARY

Various slotted heatsinks and slotted heatsink assemblies are provided comprising a base containing a plurality of slots adapted to removably secure light emitting devices, wherein each of said slots comprises at least four cavities; and a plurality of fins adjacent to and/or on top of said slots for removing heat generated by the light emitting devices. Opposing sidewalls may also be provided which, in some embodiments, can create a substantially H-shape. In one embodiment, an active cooling device, such as a fan is secured on a top end of the fins.

In this way, light emitting devices, such as light emitting diodes (LEDs) can now be removably secured to a heatsink without requiring expensive tools, while providing flexibility to the user in various applications, such as when providing aquarium lighting.

DETAILED DESCRIPTION

Figure 1A:
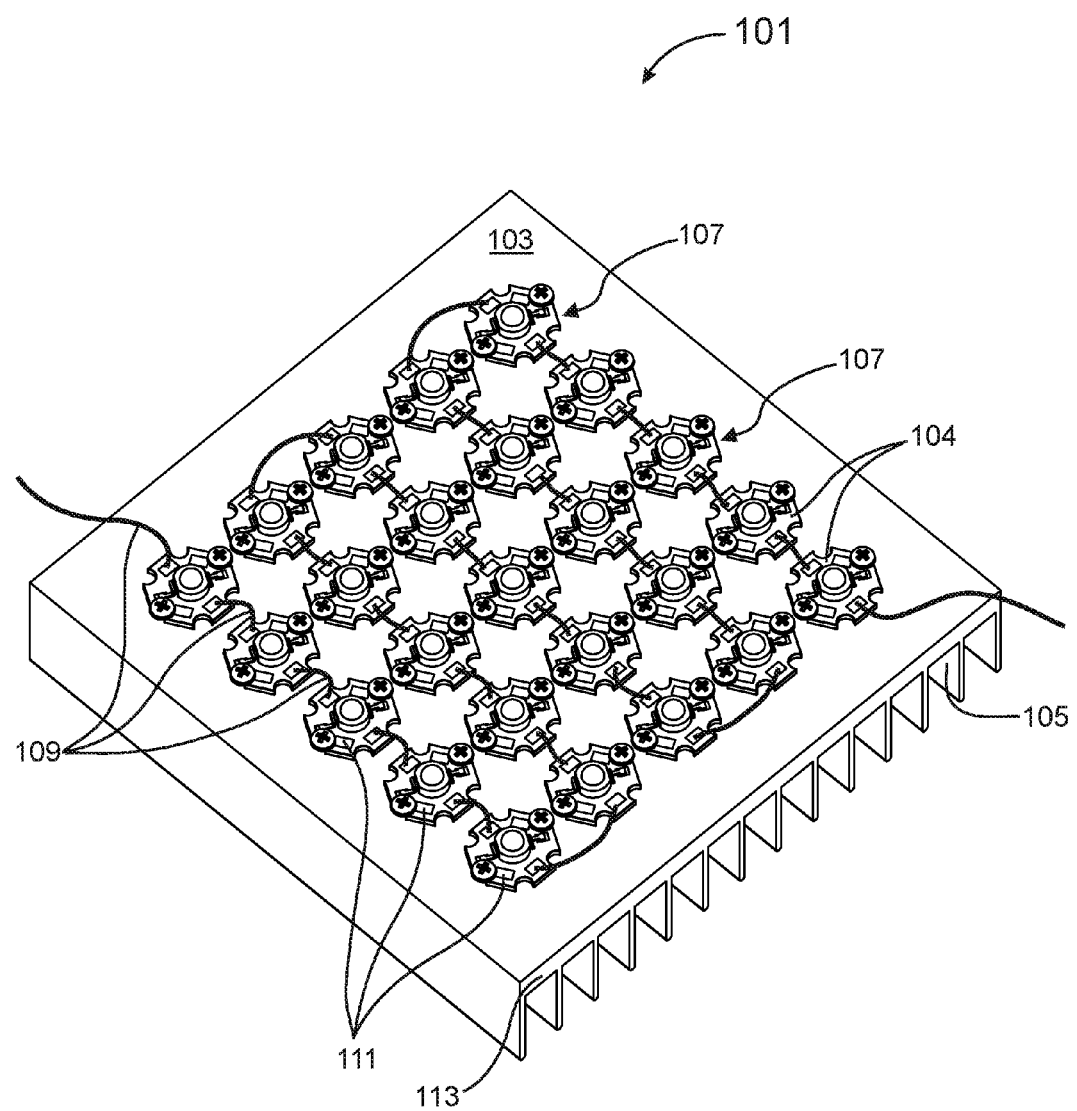
FIG. 1A is a perspective view of a prior art heatsink.

In the following detailed description of embodiments of the invention, embodiments are described in sufficient detail to enable those skilled in the art to practice them, and it is to be understood that other embodiments may be utilized and that mechanical and procedural changes may be made without departing from the spirit and scope of the present subject matter. The following detailed description is, therefore, not to be taken in a limiting sense, and the scope of embodiments of the present invention is defined only by the appended claims.

Light emitting diodes (LEDs) are often used in arrays in combination with a heatsink. However, current heatsink mounting systems can be difficult and costly to produce and do not provide flexibility for mounting, unmounting and relocating LEDs.

In one embodiment, a heatsink is provided which comprises a base containing a plurality of slots adapted to removably secure light emitting devices, wherein each of said slots comprises at least four cavities; and a plurality of fins adjacent to and/or on top of said slots for removing heat generated by the light emitting devices.

The term "slotted heatsink" as used herein, refers to a heatsink containing mounting slots to accept hardware for mounting light emitting devices.

The term "cooling device" as used herein refers to a device capable of dissipating heat away from the slotted heatsink and light emitting devices into a fluid cooling medium such as air. Such a device may be an active cooling device (e.g., fan) or a passive cooling device (e.g., fin, fin unit, etc.)

The term "slotted heatsink assembly" as used herein refers to a slotted heatsink in combination with at least an active cooling device, but can include other components to provide aesthetic benefits, such as endcaps, covers, and the like.

The term "slot" as used herein refers to a cavity configuration comprising at least three cavities capable of capturing and holding a component in place by use of hardware during use, but which can also allow for mounting, unmounting or relocating of the component.

The term "t-slot" (i.e., "lower case "t"") as used herein, refers to a cavity configuration having four cavities which are aligned in a manner to create a cross-sectional or end view appearance comparable to a lower case "t" or a "cross" comprising two linearly aligned cavities substantially perpendicular to and contiguous with two additional linearly aligned cavities. Each of the four cavities can be of substantially the same length (and/or width) or can have varying lengths and/or widths. This is in contrast to a "T-slot" (i.e., upper case "T") having a cavity configuration aligned in a manner to create only three cavities.

The term "plus-slot" or "+-slot" as used herein, refers to a cavity configuration having four cavities aligned in a manner to create a cross-sectional or end view appearance comparable to a "+" sign comprising two linearly aligned cavities substantially perpendicular to and contiguous with two additional linearly aligned cavities. Each of the four cavities can be of substantially the same length (and/or width) or can have varying lengths and/or widths.

The term "lane" as used herein, refers to a flat planar surface between two adjacent t-slots against which a light emitting device may be placed.

The term "fin" as used herein refers to a passive cooling device, i.e., structure, capable of dissipating heat.

The term "light emitting device" as used herein refers to a device capable of producing light or photons in various wavelengths, such as a light emitting diode.

The term "light emitting diode" or "LED" as used herein refers to a semiconductor light source capable of producing light in various wavelengths.

The term "star LED" or "LED star" as used herein refers to an LED attached to a thermal substrate in a polygon- circular- or oval-shaped configuration with defined hardware attachment positions.

The term "LED Chip" or "LED die" as used herein refers to a semiconductor portion of the LED which emits light.

The term "LED holder" as used herein refers to a mounting device located on top of an LED for holding an LED to a heatsink. An LED holder can optionally provide an electrical interconnect (e.g., solderless connection, connector plug, and the like) and/or an interface for an optical device (e.g., reflector, optical lens, and the like).

The term "thermal electric cooler" or "TEC" as used herein refers to a solid-state device capable of transferring heat from one side of the device to the other using the Peltier effect.

The term "heat pipe" as used herein refers to a heat moving device which uses liquid to vapor phase transitions to transfer heat from one solid interface to another.

The term "synthetic jet" as used herein refers to a device which may actuate a diaphragm back and forth in an opening to create a jet flow of air.

The term "LED driver" as used herein refers to an LED power source capable of providing a constant current as needed for powering LEDs.

The term "LED controller" as used herein refers to a device capable of dimming various LED intensities manually or in an automated fashion. A color mixing controller is one type of LED controller having multiple channels of control for multiple colors.

The term "thermal interface material" or "TIM" as used herein refers to a substance with a high thermal conductivity that fills air voids between an LED substrate and a heatsink.

The term "hardware" as used herein refers to mechanical fasteners such as nuts, bolts, machine screws, washers, and the like.

The term "liquid heat exchanger" as used herein refers to a device with chambers in which a cooling liquid can flow through to absorb heat.

The term "Printed Circuit Board" or "PCB" as used herein refers to a board with electrical circuits which may be the substrate for connecting electrical components.

The term "Metal Core Printed Circuit Board" or "MCPCB" as used herein refers to a printed circuit board with a metal base for thermal dissipation.

The term "Organic Light Emitting Device" or "OLED" as used herein refers to an LED which uses an organic compound and an electric current to produce light.

The term "Chip-On-Board" or "COB" as used herein refers to a LED substrate which has a plurality of LED chips.

Light emitting diodes (LEDs) are well known for their advantages over traditional lighting methods. See, for example, US Dept. of Energy Fact Sheet entitled, "Using LEDs to their Best Advantage" http://apps1.eere.energy.gov/buildings/publications/pdfs/ssl/led_advantage.pdf which is incorporated by reference herein in its entirety LEDs can be affixed to a variety of surfaces and mounts for use in applications including, but not limited to any type of artificial light, which includes general or special purpose lighting for indoor or outdoor residential or commercial lighting (e.g., flood lighting, high or low bay lighting, street lighting) or specialty lighting (e.g., aquarium lighting, plant/grow lighting). However, LEDs can generate high temperatures (e.g., in excess of about 100° C.) in small localized areas (e.g., such as no more than about 3.45 $mm^2$), and thus are typically used in conjunction with a heatsink to avoid overheating, premature burnout, diminished light output and/or shortened lifespan.

Conventional heatsinks, such as the block heatsink 101 shown in FIG. 1A, comprise a block shape configuration, i.e., a base with flat surface portion 103, and a series of conventional heatsink fins 105 located perpendicular to a base 113 and opposite LEDs, such as star LEDs 107. The star LEDs 107 can be secured to the flat surface portion 103 using a variety of techniques. In many instances, holes are drilled or drilled and tapped into the flat surface using various securing means, i.e., fasteners, such as screws, nuts, bolts, clips, rivets, and the like. However, such methods are not only time-consuming, but assembling these components can further require expensive electronic tools, such as a drill, a milling center, and the like. Additionally, the resulting assembly has fixed hole locations, thus providing limited flexibility for moving, upgrading or changing LEDs.

Other conventional LED securing means utilize various adhesives, epoxies, thermal tapes (i.e., adhesive thermal pads), and the like. However, such methods can not only be messy to work with, difficult to rework (i.e., take apart and update), and more costly, but these methods also degrade the thermal performance of the LEDs.

Conventional heat sinks further have limited LED driver mounting features, limited hanging features, limited LED controller mounting features, limited active cooling device mounting features, and the like. FIG. 1A shows a prior art heatsink 101 comprising a substrate 103 and fins 105. LEDs, such as star LEDs 107 having soldering pads 111 for accommodating attachment of wires 109 are attached to the substrate 104 as shown. The wires 109 are exposed between the star LEDs 107. As can be seen, the prior art heatsink 101 includes no protective shields for the star LEDs 107 shown in FIG. 1A nor are such shields typically provided in the prior art for other types of LEDs. As such, the LEDs used with prior art heatsinks, such as the star LEDs 107 shown in FIG. 1A are exposed to potential shorts and/or corrosion where the wires 113 attach to the solder pad 111. Such limitations further do not provide for an aesthetic final product.

Figure 1B:
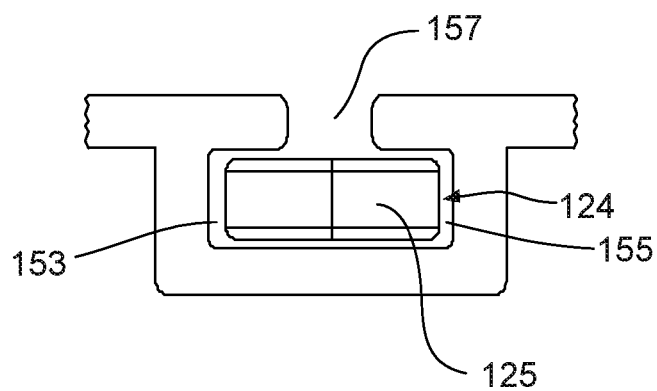
FIGS. 1B-1E are end view schematic illustrations of a conventional three cavity slot.
Figure 1C:
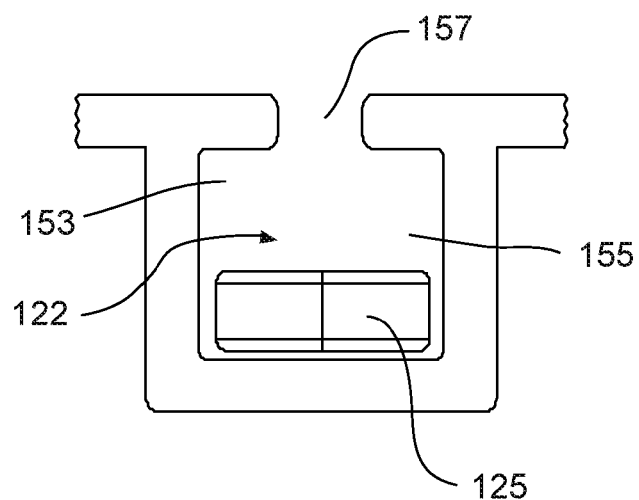

Attempts to provide more flexible options have also been less than satisfactory. For example, a T-slot configuration containing only three cavities have been proposed. While such configurations are useful in a number of applications where the design parameters are fixed (e.g., 138, FIG. 1, a T-slot recess used for hanging or mounting heatsink 100) it presents a number of drawbacks for securing light emitting devices to a heatsink. For example, as shown in FIGS. 1B and 1C, T-slot 122 and 122 respectively, has only three cavities, namely a first cavity portion 153, a second cavity portion 155, and a third cavity portion, i.e., screw opening 157. T-slots are generally suited to light fixture designs with highly fixed design parameters, for example fixed thickness LED(s), fixed fastener geometry, and fixed T-slot geometry. Such a fixed configuration may not allow for flexibility of mixing LEDs with varying thicknesses or upgrading LEDs in the future.

Such limited flexibility not preferred in the aquarium and horticulture market where users are constantly evaluating new LED technology.

Furthermore, a T-slot configuration requires the interface between the LED and the heatsink to either be a nut or a non-standard fastener. Use of a nut as the interface not only makes installation of LEDs more difficult as described below, but increases risk of damage to nearby LEDs during installation because larger tools, such as wrenches, are needed.

If the nut cavity 124 is too shallow, as shown in FIG. 1B, the vertical nut clearance is minimal, as the nut 125 is essentially being "hugged" in place from top to bottom. When working with small nut hardware, such as a #4 nut with only 3/32" of depth, a shallow nut cavity 124 allows for very little screw depth adjustment. Therefore, with a T-slot, the screw length must be precisely sized to account for LED thickness, any washer thickness, and T-slot geometry to allow adequate thread engagement with the nut 125. In such a configuration, if a screw is too long, it will bottom out in the T-slot before it can secure the LED. If a screw is too short, it may not reach to engage with the threads of the nut therefore not securing the LED. Such geometry may also not provide adequate threading depth, thus requiring the use of a specially sized screw that does not bottom out, yet grasps the nut threads adequately. Again, such a screw may be a non-standard size, and thus difficult to obtain. When working with a hex head screw in particular, non-standard screw sizes are known to be particularly difficult to obtain.

Figure 1D:
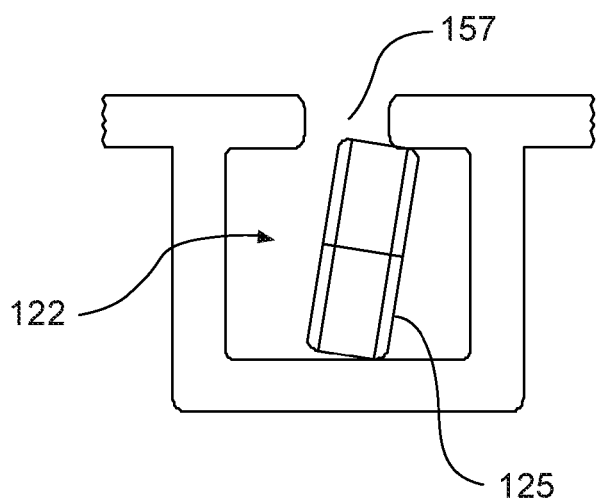
Figure 1E:
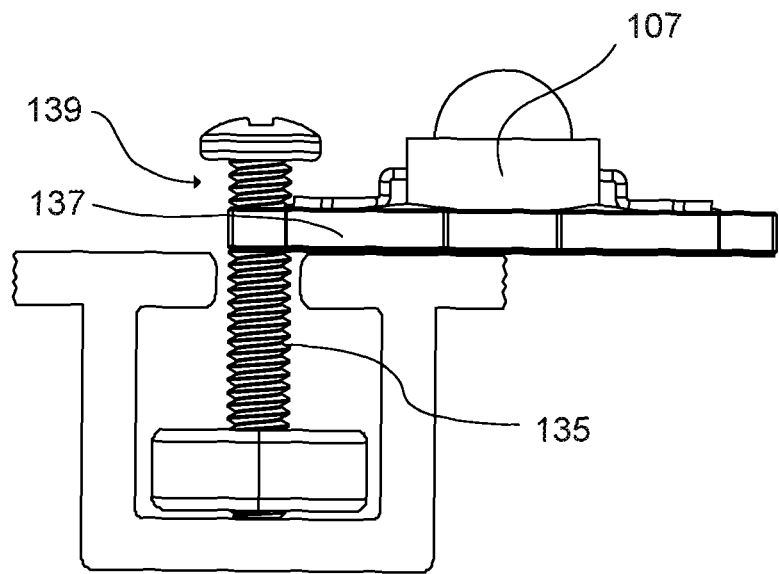

A deeper nut cavity may allow for adequate threading depth when mounting an LED. However, use of such a configuration may provide inadequate material for thermal mass and heat transfer. Furthermore, a deep nut cavity can cause difficulties during installation. For example, as shown in FIG. 1C, a nut 125 may fall to the bottom of the nut cavity 122 which is problematic when using a screw with an inadequate reach (either due to a thicker LED mounting substrate or a short screw). A deep nut cavity 122 also provides excess space, thus allowing the, nut 125 to move, i.e., rock and roll into a non-perpendicular position to the screw opening 157, as shown in FIG. 1D.

A deep nut cavity 122 may not allow for adequate depth adjustment when mounting an LED. See, for example, FIG. 1E, which shows a screw 135 bottoming out before capturing an LED mounting substrate 137 therefore creating gap 139. Such shorter screw lengths may be non-standard, and thus difficult to obtain. A T-slot configuration with abundant vertical nut clearance to capture a nut will allow for further screw depth adjustment for LED thickness, any washer thickness, or T-slot geometry.

A T-slot which is adapted to retain the head of a hexagon screw may allow use of a nut to fasten against an LED. However, such a configuration creates complications since the nut interface not only makes installation of LEDs more difficult but there is also an increased risk of damage to nearby LEDs during installation. Furthermore, depending on LED thickness, any washer thickness, and screw length, a standard length fasteners' threaded shaft may protrude beyond the height of the nut and interfere with LED accessories such as lenses, reflectors, LED holders, and the like.

The various embodiments described herein provide slotted heatsinks and slotted heatsink assemblies onto which light emitting devices, e.g., LED's, can be removably secured. In one embodiment, a slotted heatsink assembly is provided which comprises a slotted heatsink combined with an active cooling device. In one embodiment, the slotted heatsink assembly further comprises aesthetic components such as an active cooling device cover, and endcaps, such as heatsink endcaps and recess endcaps.

Figure 1F:
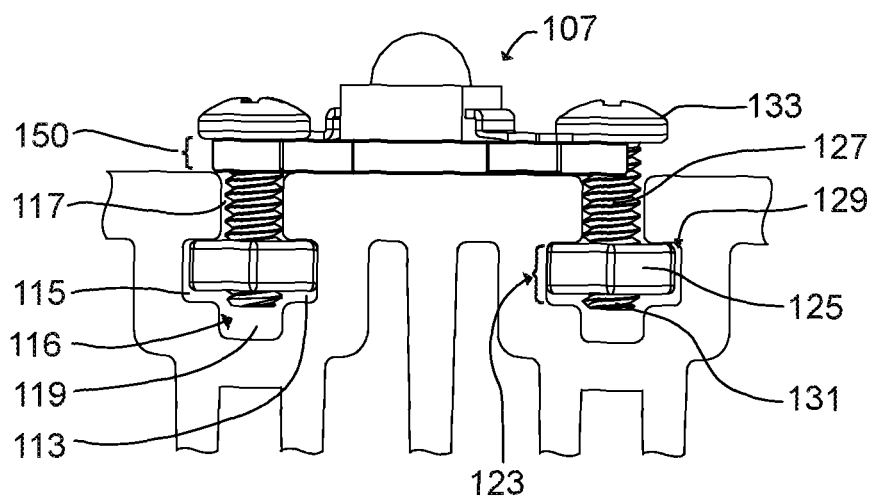
FIG. 1F is a detailed end view schematic illustration of a slot containing four cavities and an adjacent interface according to an embodiment.

The novel slotted heatsinks described herein do not rely on fixed mounting positions or on slots containing only three cavities. The attached lighting devices can therefore be easily removed and replaced using standardized mounting hardware, thus providing flexibility and convenience for the user. The slotted heatsinks each have, in various embodiments, slots which form cavities having a four-sided configuration, i.e., a "t" configuration or a plus configuration. Use of such a configuration also eliminates the need for pre-drilled or pre-drilled and tapped holes in the heatsink itself. As shown in FIG. 1F, either "t" or "+" slot configurations further not only provides first and second (three-sided) cavities 113 and 115 substantially perpendicular to and contiguous with a two-sided cavity 117, but since the first and second cavities 113, 115 are not located at one end or the other of the two-sided cavity 117, a third three-sided cavity 119, which extends beyond the two-sided cavity 117, is created. This third three-sided cavity 119 provides an additional cavity (not available in a "T" configuration) for a fastener, such as a bolt or screw, to extend therein. This configuration further allows the first and second three-sided cavities 113, 115 to form a nut-capturing cavity 123 for holding a nut 125. The nut capturing cavity 123 of a four cavity slot also provides flexibility for the user, by allowing standard hardware lengths to be used when mounting various thickness LEDs.

As such, the interface 150 between mounting hardware for the LED's and the slotted heatsink can securely make contact by using a head portion of a standard-sized multi-sided fastener rather than a nut or a non-standard size fastener, as with a T-slot. In this way, a nut can be secured as close to the two-sided cavity 117 (i.e., screw opening) as is physically possible for a given interface 150 while still providing adequate strength to the connection. The nut-capturing cavity 123 further allows a screw 127 to easily reach the nut when being threaded together during installation.

Such configurations further allow the nut 125 to remain substantially perpendicular to the fasteners and minimizes the ability of the nut 125 to move (e.g., rock, roll, twist etc.) within the mechanical clearance 129 of the nut cavity 123, particularly as compared with a T-slot. In contrast to a T-slot, the nut capturing cavity 123 also provides flexibility for the user, by allowing standard hardware lengths to be used when mounting different LED mounting substrate thicknesses. Use of such a configuration also provides more material for thermal mass and heat transfer as compared to other configurations, such as a T-slot configuration, which, due to its inherent shape, forms a larger void. As such, the novel configurations described herein provide more thermal mass for improved heat spreading as compared to a T-slot configuration.

Figure 1G:
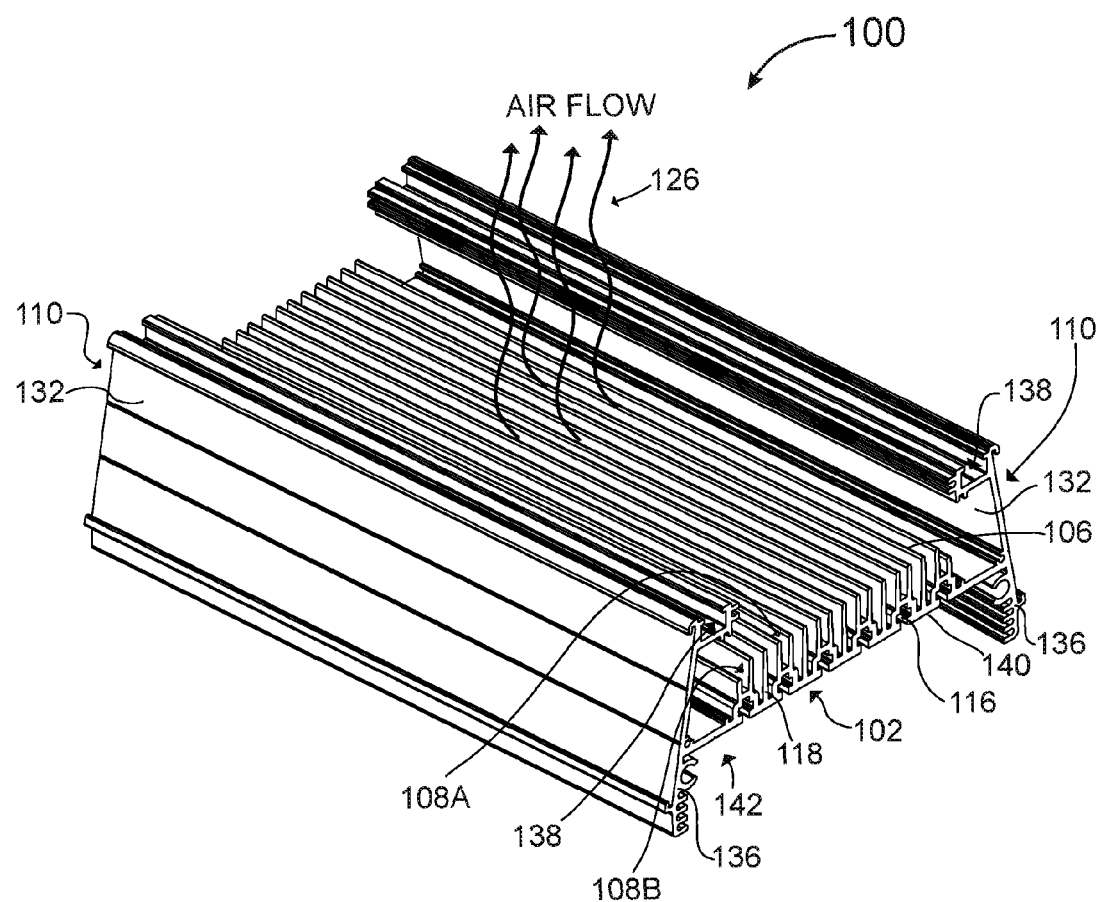
FIG. 1G is a perspective view of a slotted heatsink according to an embodiment.

FIG. 1G shows one embodiment of a slotted heatsink 100 formed from a base 102 of a given length which comprises a plurality of fins, such as fin units 108A, 108B and fins 118 which extend the given length and are arranged adjacently in a substantially parallel, i.e., side-by-side fashion, to one another. Each of the fin units 108A, 108B and fins include an upper surface 106 onto which components, such as an active cooling device (e.g., 328A, FIG. 3A) may be installed. Some or all of the fins units 108A, 108B and fins 118 may be formed together with the base 102 (e.g., extruded in a single die shape or extrusion operation). The fin units 108A, 108B and individual fins 118 are useful for allowing heat to flow away from the heatsink 100 as shown by arrows 126.

The fins units 108A, 108B extend from the base portion 102 and run the length of the heatsink 100. As such, the fin units 108A and 108B are configured to receive various types of fastening hardware (e.g., nut 125) for mounting lights, such as LEDs (e.g. 107, FIG. 1). Specifically, a base portion of each fin unit 108A, 108B forms a slot 116. Each slot 116 is separated by and adjacent to sections of the base 102 referred to as lanes 140. In the embodiment shown in FIG. 1G, the slots 116 are t-slots having a substantially lower case "t" configuration. In one embodiment, the slots 116 are plus slots having a substantially "+" configuration. In one embodiment, the fins 118 and fin members of the fin units 108A, 108B (i.e., 203, 205, FIG. 2) are also useful for dissipating heat away from light emitting devices attached to the base 102.

Figure 10A:
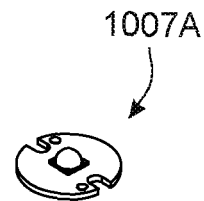
FIGS. 10A-10F are perspective views of various types of light emitting diodes according to various embodiments.
Figure 10B:
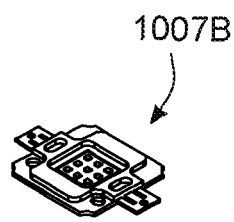
Figure 10C:
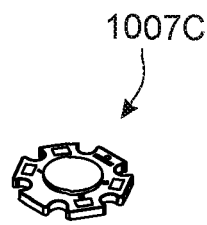
Figure 10D:
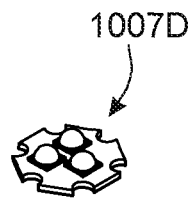
Figure 10E:
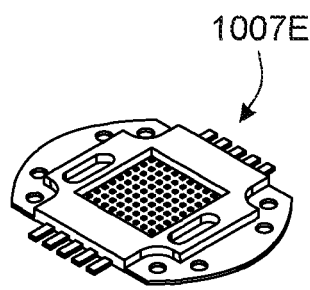
Figure 10F:
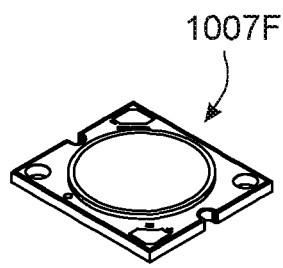

The number of lanes 140 in a base 102 may vary depending on the number of light emitting devices, light spread, light output and/or cooling capacity useful for a particular lighting application. In the embodiment shown in FIG. 1G, five lanes 140 are used, although the various embodiments of invention are not so limited. For example, fewer lanes 140, such as four, three, or two lanes, or a single lane 140 may be used. In various embodiments, more than five lanes 140 are used. Each lane 140 may have any suitable width, which can vary to accommodate different light emitting device types (e.g., 107, See also, e.g., FIGS. 10A-10F). In one embodiment, lane width is from about 12 mm to about 40 mm. In one embodiment, lane width is from about 40 mm to about 215 mm. In various embodiments, a single LED (e.g., larger COB LEDs, such as those shown in FIGS. 10E and 10F) may span over multiple lanes 140.

Figure 2:
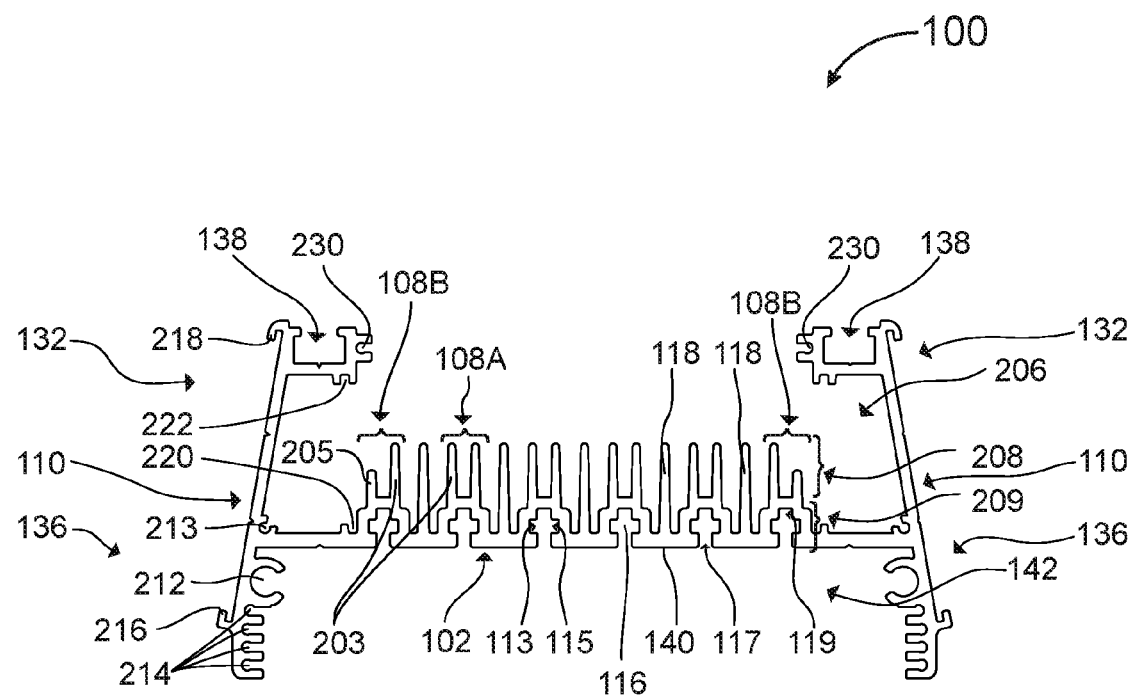
FIG. 2 is an end view of the slotted heatsink of FIG. 1G according to an embodiment.
Figure 7:
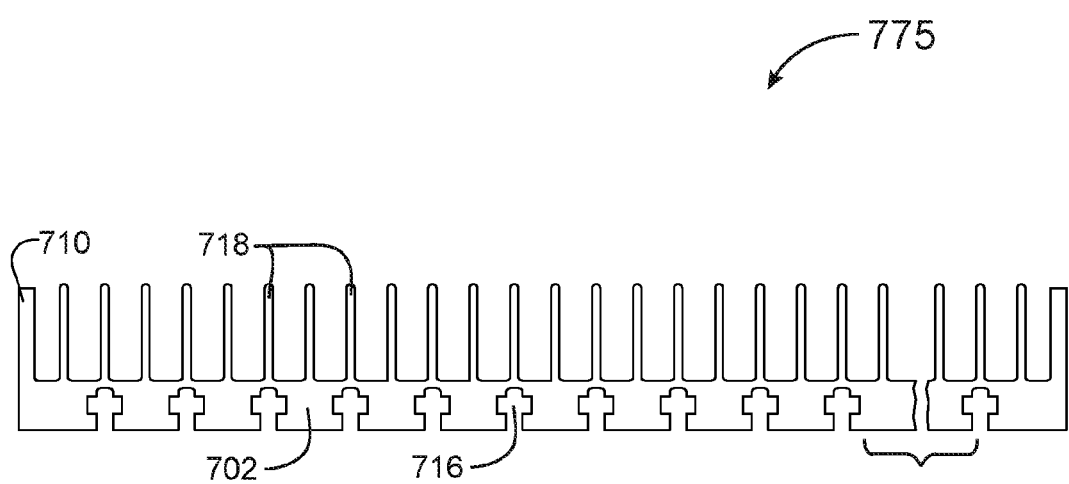
FIG. 7 is an end view of another alternative slotted heatsink according to an embodiment.

FIG. 2 provides an end view of the slotted heatsink 100. As can be seen in this view, each fin unit 108A comprises at least two fin members 203 of comparable height which form a substantially u-shape or squared u-shape on their upper portion 208 and the slot 116, on their lower portions 209. In this embodiment, each fin unit 108B is located on opposing ends of the base 102 and can comprise at least two fin members of different heights (203 and 205), such that fin members 205 are shorter than fin members 203. Such a configuration may be suitable in embodiments in which the opposing sidewalls 110 slant inwardly towards each other to create an upper cavity 206, as shown in FIG. 2. In one embodiment, the size of the upper cavity 206 is maximized to ensure the extrusion die is properly supported during manufacturing and/or to provide a concealed area for wires (e.g., 309, FIG. 3). As such, in one embodiment, the shorter fin member 205 is provided as a manufacturing aid to reduce the risk of die pieces breaking off during extrusion. In other embodiments, there are no fin units 108B and all fin units 108A have fin members 203 of substantially the same height (e.g., 718, FIG. 7).

The aspect ratio of the heatsink may vary. The aspect ratio is the fin height divided by the fin spacing (i.e., the spacing between fins). In one embodiment, the aspect ratio may be from about 0.1 and about 30. The width of the fin may also vary. In one embodiment, the fin width may range from about 0.5 mm to about 1 mm. In various embodiments, the fin width may range from about 1 mm to about 6 mm or from about 6 mm to about 20 mm.

The fin shape may also vary. In various embodiments, the fin may be substantially rectangular shaped, have drafted (i.e., sloped) walls of varying angles, be rounded near the top, have a substantially flat top or a top which appears like that of a tip of a triangle or a point. In one embodiment, the fins are perpendicular to the base (e.g. 718, FIG. 7). In one embodiment, fins 118 may extend from the base 102 at varying angles and lengths (e.g., a starburst shape). In one embodiment, each fin unit 108A and 108Bs substantially the same overall height as the fins 118. In one embodiment, a plurality of fins of varying heights may be used to form a regular or irregular pattern using any number of fin heights, such as at least two fin heights (e.g., short:tall:short:tall, tall:short:short:tall, and the like), at least three fin heights (e.g., tall:medium:short: medium:tall, and the like), further including fins of four or more different heights, and so on. In one embodiment, the fins may be serrated (i.e., notched).

Any suitable fin geometry and surface area may be used. In various embodiments, the area between the fins 118 not only provides a sufficiently large surface area, but is configured to not interfere with and/or restrict air flow, or otherwise to minimally affect air flow. In various embodiments, the heatsink 100 has a 0.05 to about 1 inch (in) center to center spacing, such as about a 0.1 to about 1 in center to center spacing, or a 0.05 to about 0.375 in center to center spacing, including any range therebetween. In one embodiment, fin spacing may be at least 0.25 in center to center spacing. In various embodiments, the fins 118 provide at least 10 in$^2$/per 1 foot (ft) section, such as at least 200 in$^2$/ft per 1 ft section, such as at least 400 in$^2$/ft surface area per 1 ft section, including any value therebetween. In one embodiment, surface area is maximized to increase its ability to convect heat away from the slotted heatsink 100 and LEDs.

The slotted heatsink 100 can have any suitable thermal resistance. In one embodiment, the thermal resistance is from about 0.005 to about 100° C./W, such as about 0.005 to about 10° C./W, such as from about 1 to about 100° C./W, including any range therebetween. In one embodiment, the thermal resistance is at least or no more than 0.4° C./W per 1 ft section. For example, thermal resistance for operation with 45 cubic feet per minute (CFM) 92 mm active cooling device may be about 0.1° C./W per 1 ft section.

The base 102 can further include sidewalls of various configurations. In the embodiment shown in FIG. 1G, the base 102 further includes or can be attached to sidewalls 110 which are configured as opposing sidewalls. In this embodiment, the base 102 and opposing sidewalls 110 are configured to form a substantially H-shaped assembly such that the base 102 forms the "crossbar" and the opposing sidewalls 110 form the "vertical bars" of an "H." In the embodiment shown in FIG. 1G, the opposing sidewalls 110 have an inwardly slanted orientation. Any suitable acute angle can be used for the opposing sidewalls 110, depending on a number of factors, such as the area needed for and/or size and shape of various components such as active cooling device(s), wiring, power supplies, LED drivers, and the like. The opposing sidewalls 110 may be angled for cosmetic reasons and/or to provide sufficient area to mount commercially available LED driver(s) (e.g., Mean Well® ELN-60 Series LED drivers, see FIG. 9, 910). Other sidewall configurations are possible (e.g., 710, FIGS. 7 and 810, FIG. 8).

Figure 3A:
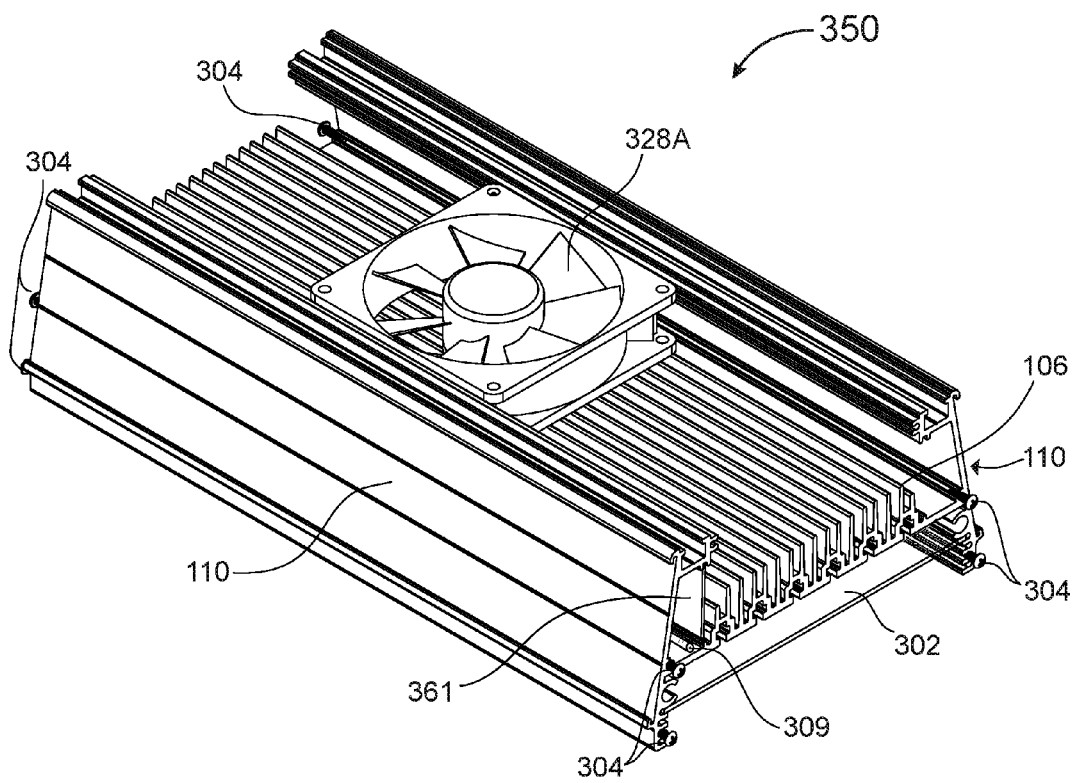
FIG. 3A is a perspective view of a slotted heatsink assembly comprising a slotted heatsink, an active cooling device comprising a fan, an active cooling device cover, and a protective shield according to an embodiment.
Figure 3B:
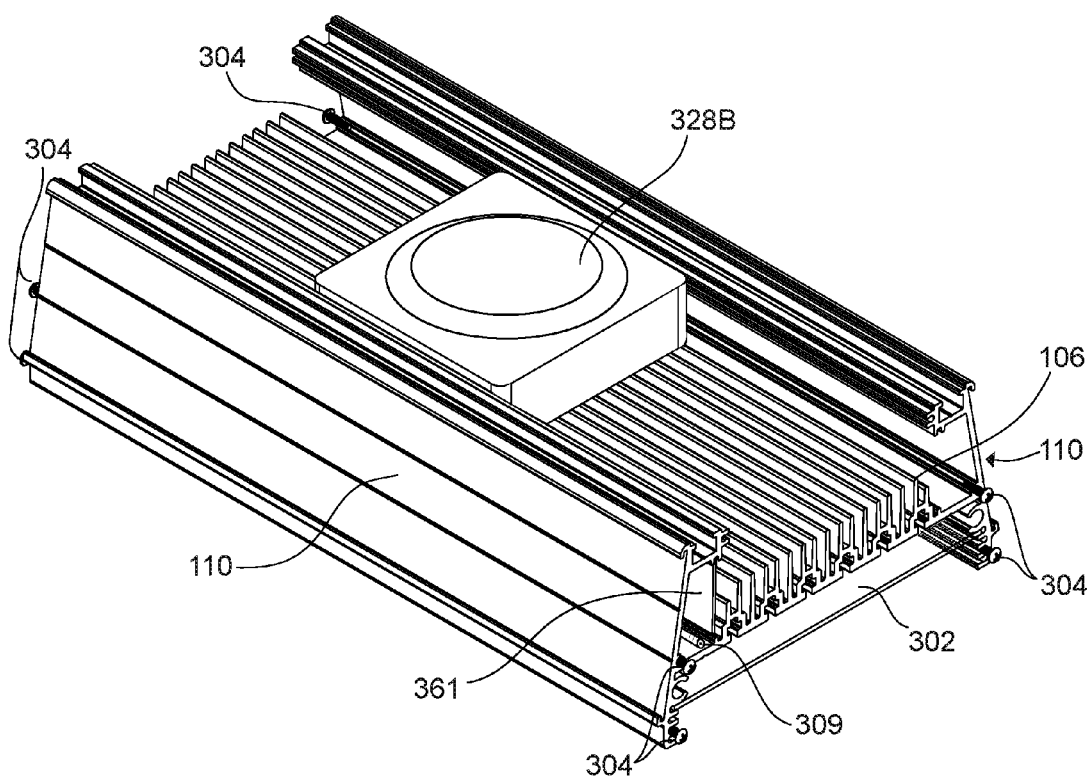
FIG. 3B is a perspective view of a slotted heatsink assembly comprising a slotted heatsink with an active cooling device comprising a synthetic jet according to an embodiment.

During use, airflow may be achieved passively, i.e., naturally, by free air convection 126 or by using a forced air active cooling device, such as the fan 328A shown in FIG. 3A. In one embodiment, the fan 328A provides about 10 to about 50 CFM, such as at least 45 CFM and can dissipate over 100 W of power while keeping temperatures at an LED junction (i.e., the temperature in the semiconductor) below a desired temperature, such as about 100° C. Temperatures in excess of about 150° C. may permanently damage or destroy a light emitting device, such as an LED star 107. In one embodiment, any suitable CFM fan is used to keep the heatsink within a safe operating temperature. In one embodiment, a fan with a displacement of about 50 to about 500 CFM may be used to keep a heatsink with a power greater than 100 W within an acceptable temperature range.

Referring again to FIGS. 1G and 2, each opposing side wall 110 includes an upper region 132. In one embodiment, the upper regions 132 are contiguous with the base 102 and plurality of fin units 108A and 108B and the fins 118. The upper regions 132 further include recesses 138 (i.e., a T-slot) running the length of the opposing sidewalls 110 and configured to slideably secure to the desired equipment to a structure with fastening means, such as nuts and bolts, e.g., to an aquarium hood, ceiling, rack (e.g. shelving) and/or to hanging cables (e.g., aircraft cable with eye loops). Recesses 138 may also be useful for mounting accessories, such as LED drivers (e.g., MakersDRIVER™, see also FIG. 9, 920), or cooling device covers 430 e.g., fan cover).

Referring again to FIGS. 1G and 2, each opposing side wall 110 includes a lower region 136. These side walls 110 form a lower cavity 142 formed below the base 102. This cavity 142 is used to mount light emitting devices (e.g., 507, FIG. 5).

In the embodiment shown in FIG. 2, each of the opposing side walls 110 contains screw bosses 213, 214, configured to accept threaded screws 304 for fastening heatsink endcaps (e.g., 452, FIG. 4) onto the slotted heatsink 100. The area located between opposing screw bosses 214 may also be used to retain a protective shield (e.g., 302, FIG. 3). In one embodiment, the protective shield is a substantially translucent sheet of material (e.g., Plexiglass® Acrylic glass). In another embodiment, the protective shield has light diffusing properties.

Various additional linear or curving bosses may optionally be provided for a variety of purposes. For example, a boss may be provided within the lower sidewall region 136 or may be contiguous with the lower sidewall region 136. Such a boss may be configured to provide a recess for a supporting structure, such as a dowel or rod (e.g., 930, FIG. 9). The boss may have any suitable shape or curvature and can be customized to match the shape of the supporting structure, such as a substantially cylindrical or multi-sided dowel.

Figure 9:
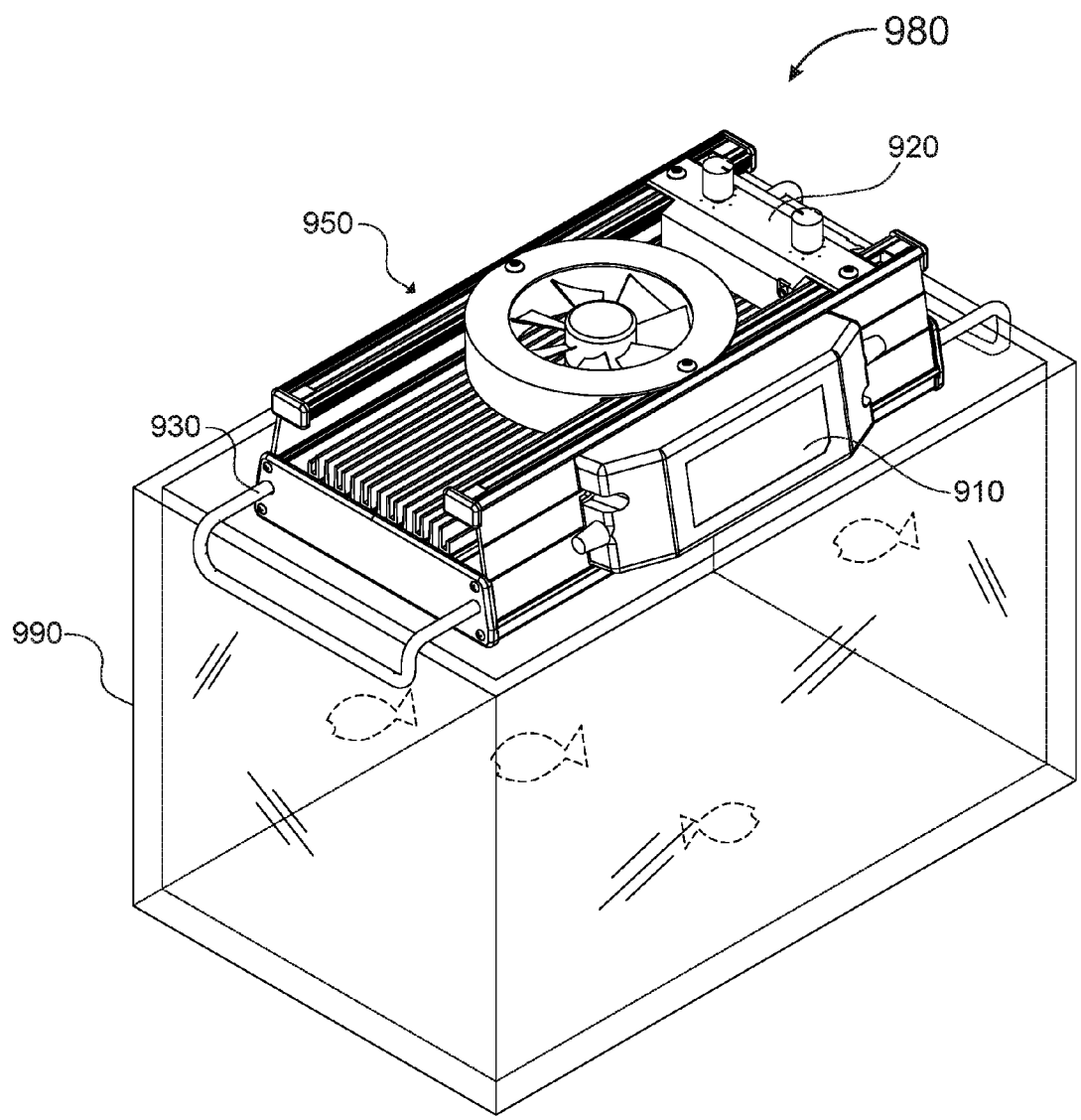
FIG. 9 is a simplified perspective view of a heatsink assembly with LEDs mounted thereon in use on an aquarium according to an embodiment.

In the embodiment shown in FIG. 2 the slotted heatsink 100 includes a first boss 212 having a semi-circular profile contiguous with each of the lower sidewall regions 136 and configured to accept a cylindrical supporting structures, such as a cylindrical dowels or rods (e.g., 930, FIG. 9) used to rest upon the ledge of an aquarium (e.g., 990, FIG. 9).

In the embodiment shown in FIG. 2, a second boss 216 may optionally be formed adjacent to or contiguous with each of the outer lower sidewall regions 136 and an optional third boss 218 may similarly be formed adjacent to or contiguous with each of the outer upper sidewall regions 132. The second and third bosses, 216, 218 together can provide a recess for a cosmetic component, such as a cosmetic plate or strip (e.g., Laminate Formica®) on each side of the slotted heatsink 100. In one embodiment, the cosmetic components can be inserted along the lengths of the second and third bosses 216, 218 to provide particular colors, finishes, and/or cosmetic appearances to each side of the slotted heatsink 100.

In one embodiment, the second and third bosses may be utilized as a connecting interface for other components. For example, such bosses may be used to attach an LED controller with attachment features substantially shaped like the inner cavity of the second and third boss geometry, allowing for the matching geometry to slide or snap into the second and/or third boss essentially like a puzzle piece.

In one embodiment, a fourth boss 220 may optionally be formed on an upper surface of the base 102 adjacent to fin units 108B and a fifth boss 222 may optionally be formed below a bottom surface of the recess 138. The fourth and fifth bosses, 220, 222 together can provide additional recesses to accept various components, such as standard circuit boards (e.g., 361, FIG. 3), e.g., standard thickness 1.6 mm circuit board and/or divider walls. In various embodiments, a circuit board may be used to provide circuitry to an LED driver, an LED controller, and the like. In various embodiments, the divider walls may be used to enclose wire 309 running along the length of the cavity 206. The divider walls (e.g., 361, FIG. 3) may be made from any suitable material, such as a thin semi-ridged (e.g., plastic) material.

In one embodiment, an optional sixth boss 230 may be added to an inner side of each of the recesses 138 as shown in FIG. 2. Each sixth boss 230 may be used to hold a fin cover (not shown) which can be a substantially flat piece of material (e.g., opaque plastic) to cover the fins 118 and fin units 108A and 108B for cosmetic purposes.

As noted above, fins 118 and fin units 118A and 118B provide a passive cooling device, by allowing natural convection cooling 126 to dissipate heat. However, in some embodiments, one or more active cooling devices may be used to further aid in heat dissipation. Any active cooling device with sufficient capacity to keep light emitting devices within a safe operating range is sufficient. Such devices may include, but are not limited to, one or more fans, heat pipe thermoelectric coolers (TEC), synthetic jets (See FIG. 3B, 328B) and/or liquid heat exchangers, and the like. In one embodiment, a personal computer (PC) fan is used. In one embodiment, the PC fan has approximate dimensions of 92×92×25 mm (e.g., FIG. 3A, 328A), although the various embodiments are not so limited.

Figure 4:
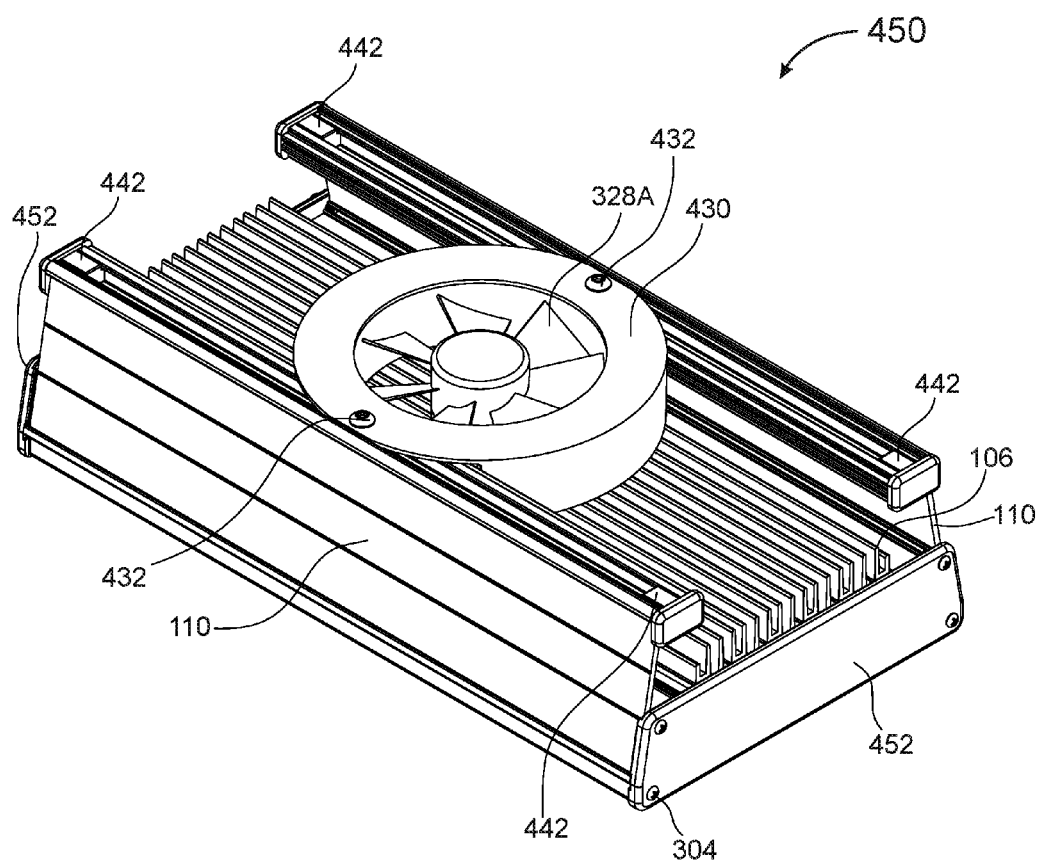
FIG. 4 is a perspective view of an alternative slotted heatsink assembly according to an embodiment.

Therefore, in some embodiments, the slotted heatsink 100 may be combined with other components, such as an active cooling device, to form a heatsink assembly, such as the heatsink assemblies 350, 450 shown in FIGS. 3 and 4. In these embodiments, each assembly 350, 450 includes a fan 328 as an active cooling device. The slotted heatsink assembly 450 shown in FIG. 4 further includes a fan cover 430. As can be seen, the top surfaces 106 on each of the fins 118 and fin units 108A and 108B are adapted to receive one or more active cooling devices (e.g., FIG. 3A, 328A) between the opposing sidewalls 110. The active cooling device (e.g., FIG. 3A, 328A) may be fixed into place with an active cooling device cover 430, using fasteners 432, such as machine screws and nuts which mount into the upper recess 138.

For mounting, aesthetic or safety purposes, the ends of recesses 138 of each sidewall 110 may be capped with upper recess endcaps 442 as shown in FIG. 4. Similarly, heatsink endcaps 452 may be placed on either end of the heatsink assembly 450 to form an enclosed housing to protect the LEDs (not shown) and electrical connections (e.g., wires 609 and solder pads 611), from their surrounding environment, as shown in FIG. 6.

Any suitable fasteners or fastening means may be used to join LED s to a slotted heatsink. In one embodiment, the fastening means comprise a hexagon headed screw or bolt ("hex cap") together with a suitably sized nut. In one embodiment, the fastening means comply with Society of Automotive Engineers (SAE) standards. In one embodiment, the fastening means comprise a Philips head screw, such as a 4-40 size ⅜" 127 and a suitably sized nut #4 nut 125. Such a screw is useful in attaching a variety of light emitting devices, such as a 20 mm star LED. In one embodiment, the fastening means comply with metric standards. In one embodiment, a screw or bolt with any suitable type of head is be used (e.g., Philips, flat blade, hex drive, torx, and the like).

Figure 5:
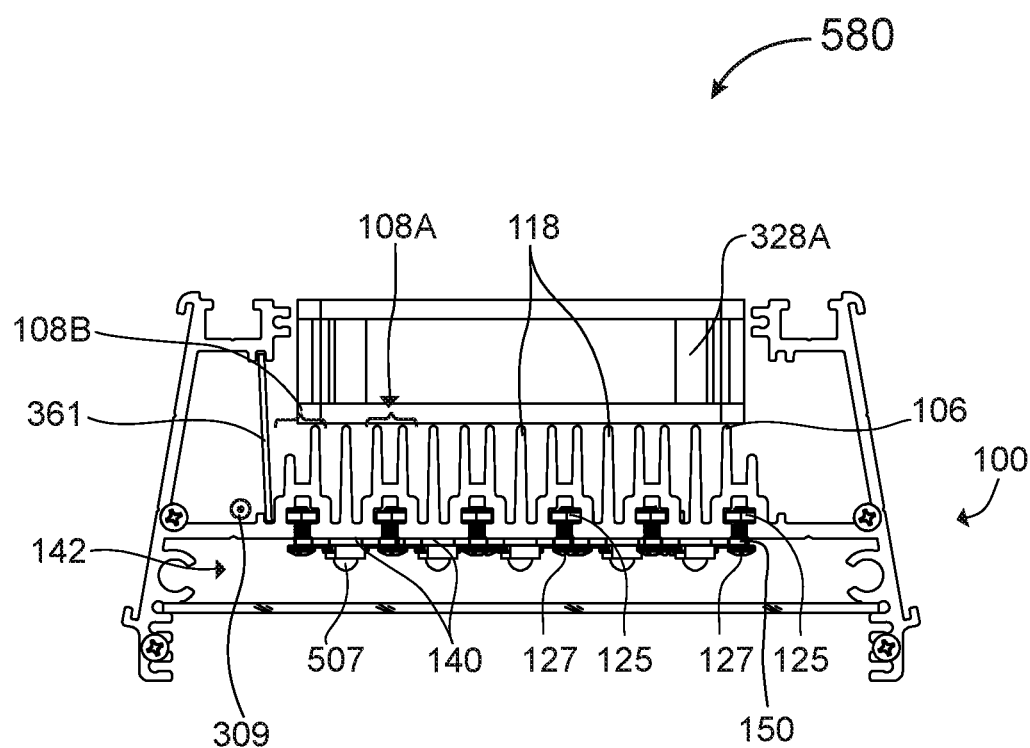
FIG. 5 is an end view of the slotted heatsink assembly shown in FIG. 3 with light emitting devices mounted thereon according to an embodiment.

FIG. 5 shows one embodiment of a system 580 comprising the slotted heatsink assembly 100 and an active cooling device (e.g., FIG. 3A, 328A) (no cover) and a plurality of LEDs 507. In other embodiments, an active cooling device cover 430 may be added and secured as described above. In this embodiment, the active cooling device (e.g., FIG. 3A, 328A) rests on the upper surfaces 106 of the fin members 203 and 118, but not on the shorter fin members 205. Each LED 507 is secured (via its respective mounting hardware) to the t-slots 116 with fastening means comprising two screws 127 and two nuts 125 with the head of each screw secured to and in contact with the LED mounting interface 150.

Figure 6:
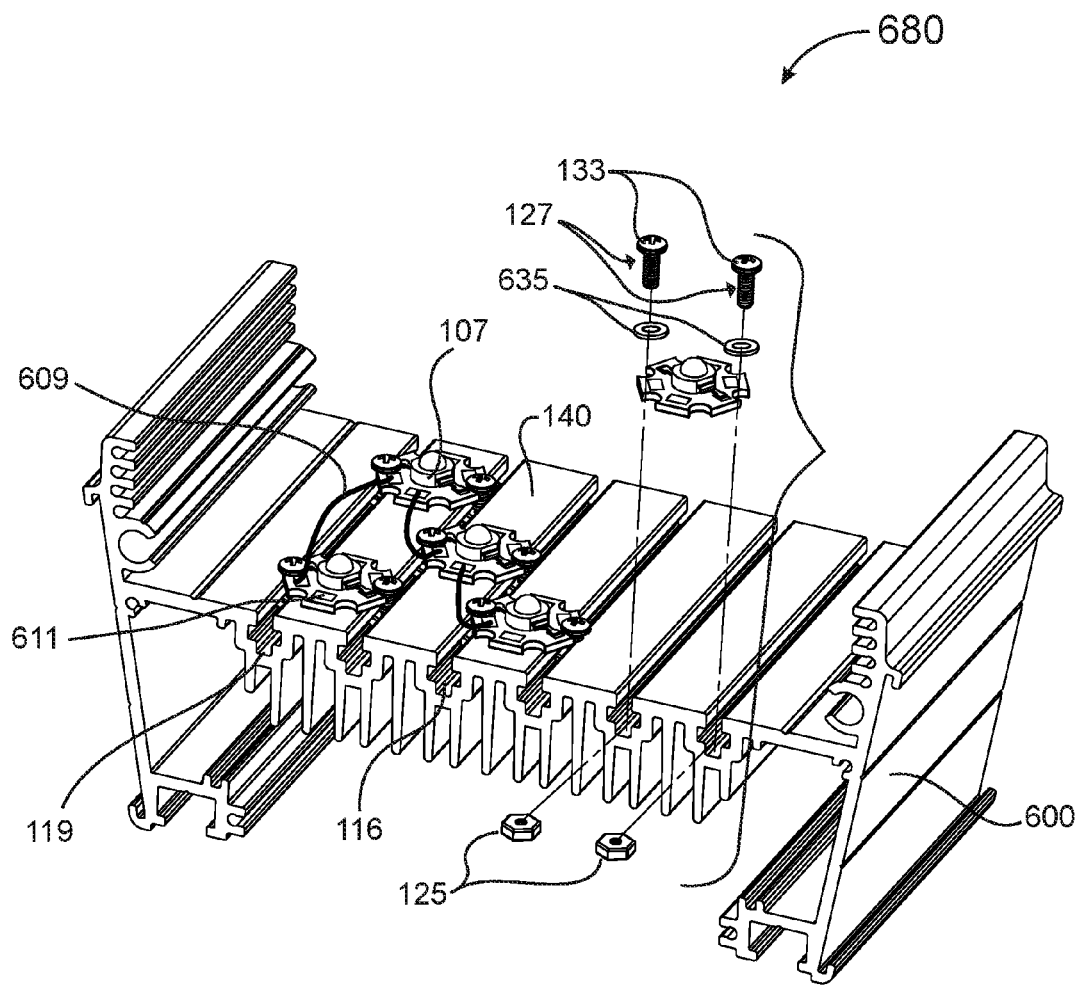
FIG. 6 is an exploded view of t-slots, a star light emitting diode (LED) and mounting hardware according to an embodiment.

As shown more clearly in the system 680 shown in FIG. 6, an LED, such as the star LED 107, can be initially placed onto a desired lane 140 and secured, at least partially, with suitable fastening means, such as the two screws 127 and two nuts 125—In the embodiment shown in FIG. 6, washers 635 are also used. Thereafter, the star LED 107 can be moved (i.e., slid) back and forth in its lane 140 until the desired position is reached. Once in the desired position each of the screws and nuts, 127 and 125, respectively, associated with a particular star LED 107 may be tightened, such as with a screwdriver, to keep the star LED 107 in the desired position during use. If an alternate position is desired, the process is performed in reverse, by loosening the screws and nuts, 127 and 125, associated with the particular star LED 107 respectively, and moving (i.e., sliding) the star LED 107 to a different position in its original lane 140. Additionally or alternatively, the star LED 107 may be completely removed from its original lane 140 and placed against a new lane 140 or the star LED 107 can be replaced either with a different star LED 107 or with a different type of LED altogether. In various embodiments, other LEDs may be used, including, but not limited to, a COB multi-chip LED (See FIGS. 10B-10F) and/or LED modules having other desired shapes (e.g., a rectangular MCPCB shape with attached LEDs).

In various embodiments, each lane 140 has a surface which is substantially flat, thus allowing the LED, such as the star LED 107, to be flush against the lane 140 to maintain a sufficiently high thermal transfer to the heatsink. The presence of air gaps beneath the LED is undesirable as it increases thermal resistance. In one embodiment, a thermal interface material, which may be a grease or paste (e.g., Arctic Silver® 5) may be used to fill in any air gaps which may be present due to, for example, minute imperfections in the surfaces being joined.

With the fourth cavity portion 119 as described above, including in FIG. 1F, the unique four cavity design of the various embodiments described herein provides a space, i.e., a screw opening, for an end portion 131 of the screw 127 while also allowing the screw 127 to grasp the nut 125 tightly and thus make contact with the interface 150. In this way, each LED 507 may be securely fastened to the slotted heatsink 100 for proper thermal transfer. Furthermore, since LEDs can be of varying thicknesses, the fourth cavity portion 119 provides sufficient room for screws 127 of varying lengths, thus increasing the flexibility of this design for use with a variety of LEDs. In one embodiment, the slotted heatsink 100 is useful with LEDs having a screw mounting area ranging from about 0.15 mm to about 2 mm or more, such as up to about 6.5 mm, although the embodiments are not so limited. The additional space provided by the fourth cavity portion 119 further allows the option of using a washer, such as a nylon washer 635, to isolate the fastening means (e.g., screws 127 and nuts 125) from electrical connections (e.g., solder pads, 611) present on a top surface 104 of the LED 107. In one embodiment, the screw head 133 has a low profile (i.e., less than about 6.5 mm) to accommodate top-mounted LED accessories, including, but not limited to lenses, reflectors, LED holders (e.g., BJB® Lampholder or Molex® LED holders), and the like.

Alternative heatsink configurations are also possible. In the embodiment shown in FIG. 7, for example, a heatsink configuration 775 is shown comprising a base 702 containing four-cavity slots, 716 located on a lower portion of the base 702 and fins 718 extending from an upper portion of the base 702. In this embodiment, the opposing sidewalls 710 comprise only an "upper region" contiguous with the base 702 and plurality of fins 718. In contrast to the configuration shown in FIGS. 1G and 2, the slots 716 in this embodiment are formed out of a solid base 102, such that the fins 718 are all of substantially the same height, thus creating heatsink configuration 775 with a "comb like" appearance. As such, in this embodiment, there are no fin units (e.g., 118A and 118B shown in FIGS. 1G and 2). In other embodiments, the fins 718 located on each end may be of different heights.

Figure 8:
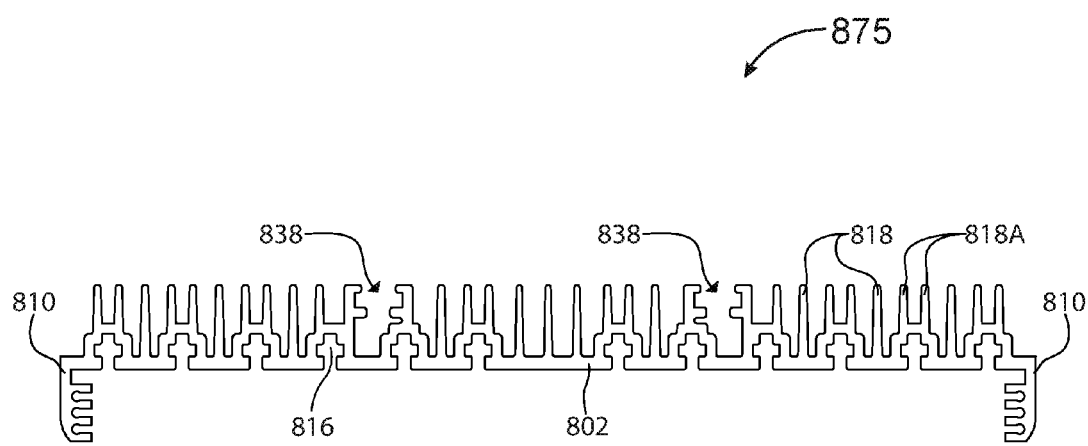
FIG. 8 is an end view of yet another alternative slotted heatsink according to an embodiment.

In the embodiment shown in FIG. 8, the heatsink configuration 875 comprises a base 802 containing four cavity slots, 816 located on a lower portion of the base 802, together with fins 818 and fin units 818A extending from an upper portion of the base 802. In this embodiment, the opposing sidewalls 810 comprise only a "lower region" (e.g., 136). In contrast to the configuration shown in FIGS. 1G and 2, there are no fin units 108B containing fin members of differing heights in this embodiment. Additionally, upper recesses 838 are provided periodically as shown to accept hardware for hanging or mounting similar to recesses 138 discussed above.

The slotted heatsink 100 can be made of any suitable material with an affinity to thermally conduct heat. In one embodiment, copper, ceramic, conductive polymer plastic (e.g., CoolPoly®), aluminum, aluminum alloys (e.g., 6063), and combinations thereof, may be used. In one embodiment, the aluminum finish is anodized to improve emissivity.

The slotted heatsinks and slotted heatsink assemblies described herein can be manufactured in any suitable manner. In one embodiment, the slotted heatsinks are manufactured in a single extrusion operation without additional manufacturing or machining operations. In one embodiment, the extrusion process uses a die or tool to form a slotted heatsink while an aluminum billet at a sufficiently high temperature (e.g., greater than 260° C.) is pressed through the die with sufficient force (e.g., magnitude of at least $2 \times 10^5$ lb$_f$) to produce the desired shape. In one embodiment, the slotted heatsinks are formed by methods ranging from casting, fin bonding (e.g., by brazing or thermal epoxy), machining, 3D printing (e.g., metal laser sintering), and combinations thereof.

When creating or building a custom fixture for a particular use, the various embodiments described herein, allow for easy removal and replacement of light emitting devices. In a particular embodiment, such as when used with an aquarium, such flexibility not only provides an aquarist with the ability to choose his/her own spectrum of light, but also to continue to adjust and/or upgrade LEDs with the latest LED technology. In one embodiment, a heatsink assembly (e.g., 350, 450) with LEDs, LED driver, and controller, is attached and used over an aquarium to simulate a more natural environment or entertaining display which may include sunrise, sunset, cloud cover, lightning, lunar cycles, color changing, or fading. See, for example, FIG. 9 which shows an aquarium 990 with a slotted heatsink assembly 950 and LED Drivers 910, 920 (e.g., Meanwell® ELN 60 and MakersDRIVER™, respectively) with an LEDs (not shown) attached thereto.

In one embodiment, a heatsink assembly with LEDs, a LED driver, and a controller, is attached and used in a horticulture setting to utilize differing wavelengths which may produce vegetative growth or flowering.

The various embodiments provide a novel and convenient slotted heatsink, while providing a simple way to handle and mount an LED, as well as dissipate heat away from the LED and make electrical connections to the LED (e.g., FIG. 10A-10F).

Any suitable type of light emitting device may be connected to the slotted heatsink 100. In one embodiment, LEDs, such as star LEDs or plasma light source module may be used. A star shaped LED is generally considered to include an LED attached to a circuit board substrate (e.g., MCPCB) with a screw mounting pattern. In one embodiment, the star LED may have one or more chips mounted and wire bonded to star LED electrical connections. Star LEDs are often also referred to as LED stars, batwing LEDs, polygon-shaped LEDs, star board, mountable stars, mountable LEDs, and the like.

Star LED sizes will vary by manufacturer. In one embodiment, an LED star has about an 18 to 23 mm diameter. For example, LED manufacturers such as Cree®, Osram®, and Philips Lumileds® provide star-shaped reference designs for their various star LEDs with an approximately 20 mm width. The Luxeon® star reference design is 19.917 mm in width. In one embodiment, star LEDs, such as those used in flashlights, which have a 14-20 mm diameter, are used. See, for example 1007A in FIG. 10A which shows a star LED typically used in flashlights. Star LEDs may be a carrier for a single LED (e.g., 1007A, 107) or for multiple LEDs or chips (e.g., 1007D, 1007C).

In one embodiment, a Chip-on-board (COB) LED also known as a multichip LED array (See FIGS. 10B-10F) may be mounted to the heatsink assembly (e.g., 350, FIGS. 3 and 450, FIG. 4).

In one embodiment, LEDs are mounted to a rectangular PCB or MCPCB strip, which are secured to one or more lanes 140 of the heatsink assembly (e.g., 350, 450) by use of hardware and the t-slots.

In another embodiment a plasma light source, OLED light source, fluorescent light source, a laser diode light source, or a polymer electroluminescent light source may be secured to the heatsink assembly (e.g., 350, 450) by use of hardware and the t-slots.

In various embodiments, a heatsink is provided comprising a base containing a plurality of slots ("t" or plus ("+") configuration) adapted to removably secure light emitting devices, wherein each of said slots comprises at least four cavities; and a plurality of fins adjacent to and/or on top of said slots for removing heat generated by the light emitting devices. In one embodiment, each of said slots comprise first and second three-sided cavities substantially perpendicular to and contiguous with a two-sided cavity; and a third three-sided cavity which extends beyond the two-sided cavity.

In various embodiments, the heatsink may further comprise lanes located between each of said slots against which the light emitting device can be secured, wherein a single light emitting device can be secured using two slots. The single light emitting device, can comprise multiple sources of light, such as at least one light emitting diode (LED) having a mounting substrate containing openings, wherein the mounting substrate is configured to attach to said slots with fasteners (e.g., screw and nut) secured in the openings. Such a heatsink configuration allows a screw to extend into the third three-sided cavity and the first and second three-sided cavities form a nut-capturing cavity as needed.

The fins can comprise individual fins and fin units, each fin unit can comprise at least two fin members and a base portion, and the base portion comprises one of said slots. Such fin members may be of substantially equal height or have different heights.

In one embodiment, the fins comprise a series of individual fins and said base is solid between each of said slots. Such fins may be of substantially equal height or of varying heights.

The heatsink may further comprise opposing sidewalls connected to the base which can form any suitable shape, such as a substantially H-shaped housing. In one embodiment, the two opposing sidewalls slant inwardly towards the base. In various embodiments, opposing bosses may be included in the opposing sidewalls for mounting the heatsink to a structure (e.g., aquarium, aquarium hood, ceiling, rack, and the like).

The heatsink may further comprise one or more active cooling devices (e.g., fan, heat pipe, a thermoelectric cooler, a synthetic jet, a liquid heat exchanger, and combinations thereof) located between the opposing sidewalls and adjacent to an upper end of the fins, wherein the heatsink and said active cooling devices form a slotted heatsink assembly. The heatsink may further comprise covers to protect components from environmental elements and/or for aesthetic purposes, such as an optional cover for each of the one or more active cooling devices, and/or a protective shield for covering the light emitting devices, and/or one or more endcaps, such as heatsink endcaps 452 or upper recess endcaps 442.

The base and fins of the heatsink may be made from any suitable material, including, for example, aluminum, an aluminum alloy, copper, polymer, ceramic, and combinations thereof.

In one embodiment, a system is provided comprising a heat sink assembly which comprises a base containing a plurality of slots adapted to removably secure light emitting devices (e.g., LEDs, such as a star LED or COB LED), wherein each of said slots comprises at least four cavities; a plurality of fins adjacent to and/or on top of said slots for removing heat generated by the light emitting devices; and an optional active cooling device connected to the heatsink assembly (e.g., mounted on top of said fins); and at least one light emitting device mounted to the heatsink assembly. The system may be configured for various uses, such as an aquarium light, a grow light or general lighting purposes.

In one embodiment, a method is provided comprising forming a heatsink comprising a base and a plurality of fins adjacent to the base, wherein the heatsink contains a plurality of slots adapted to removably secure light emitting devices, wherein each of said slots comprises at least four cavities. In various embodiments, the plurality of fins may comprise a plurality of fin units each having at least two fin members separated by individual fins. In one embodiment, the method further comprises attaching one or more active cooling devices to the heatsink to form a heatsink assembly. In various embodiments, the method further comprises attaching covers for each of the one or more active cooling devices, one or more protective shields and one or more endcaps to the heatsink assembly.

The slotted heatsinks described herein provide a novel and easy solution for integrating various types of light emitting sources with a heatsink in an economical and flexible manner. In various embodiments, the slotted heatsinks are combined with suitable active cooling devices and, optionally, other components (e.g., endcaps and covers) to form a slotted heatsink assembly.

Although specific embodiments have been illustrated and described herein, it will be appreciated by those of ordinary skill in the art that any procedure that is calculated to achieve the same purpose may be substituted for the specific embodiments shown. This application is intended to cover any adaptations or variations of the present subject matter. For example, although the various embodiments have been described with respect to substantially rectangular slotted heatsinks, a slotted heatsink may also have other configurations, such as a semicircular shape. Therefore, it is manifestly intended that the various embodiments be limited only by the claims and the equivalents thereof.

What is claimed is:

1. A heatsink comprising:
   a base containing a plurality of slots adapted to removably secure one or more light emitting devices thereto, said light emitting devices also connected to a mounting substrate, wherein each of said slots has a bottom edge and a cross sectional appearance comprising a lower case "t" configuration or a plus configuration and comprises at least four cavities which include:
      first and second three-sided cavities substantially perpendicular to and contiguous with a two-sided cavity, wherein the first and second three-sided cavities form a nut-capturing cavity; and
      a third three-sided cavity extending beyond the two-sided cavity, wherein the third three-sided cavity is adapted to allow an end portion of a fastener to extend therein and an opposing head portion of the fastener to make contact with the mounting substrate; and
   a plurality of fins adjacent to and/or on top of said slots for removing heat generated by said light emitting devices.

2. The heatsink of claim 1 wherein the heatsink further comprises lanes located between each of said slots against which said light emitting devices can be secured, wherein a single light emitting device can be secured using two slots.

3. The heatsink of claim 2 wherein the single light emitting device can comprise multiple sources of light.

4. The heatsink of claim 1 wherein the mounting substrate contains one or more openings, and the opposing head portion of the fastener makes contact with one of said openings, further wherein the third three-sided cavity is defined on one side by the bottom edge of the slot and is further adapted to allow the end portion of the fastener extending therein to avoid contact with the bottom edge of the slot.

5. The heatsink of claim 4 wherein the fastener is adapted to engage with a nut located in the nut-capturing cavity.

6. The heatsink of claim 1 wherein said fins comprise individual fins and fin units, each fin unit comprises at least two fin members and a base portion, and the base portion comprises one of said slots.

7. The heatsink of claim 6 wherein said fin members are of substantially equal height.

8. The heatsink of claim 6 wherein said fin members have different heights.

9. The heatsink of claim 1 wherein said fins comprise a series of individual fins and said base is solid between each of said slots.

10. The heatsink of claim 9 wherein each individual fin is of substantially equal height.

11. The heatsink of claim 1 further comprising opposing sidewalls connected to the base.

12. The heatsink of claim 11 wherein the opposing sidewalls and base form a substantially H-shaped housing.

13. The heatsink of claim 12 wherein the two opposing sidewalls slant inwardly towards the base.

14. The heatsink of claim 12 further comprising opposing bosses formed in the opposing sidewalls for mounting the heatsink to a structure.

15. The heatsink of claim 12 further comprising one or more active cooling devices located between the opposing sidewalls and adjacent to an upper end of the fins, wherein the heatsink and said active cooling devices form a slotted heatsink assembly.

16. The heatsink of claim 15 further comprising a protective shield and/or one or more endcaps, and, optionally, one or more cooling device covers.

17. The heatsink of claim 15 wherein said active cooling device comprises a fan.

18. The heatsink of claim 1 wherein the base and said fins are made of a material selected from aluminum, an aluminum alloy, copper, polymer, ceramic, and combinations thereof.

19. A system comprising:
    a heat sink assembly comprising:
       a base containing a plurality of slots adapted to removably secure one or more light emitting devices thereto, said light emitting devices also connected to a mounting substrate, wherein each of said slots has a cross sectional appearance comprising a lower case "t" configuration or a plus configuration and comprises at least four cavities which include:
          first and second three-sided cavities substantially perpendicular to and contiguous with a two-sided cavity, wherein the first and second three-sided cavities form a nut-capturing cavity; and
          a third three-sided cavity extending beyond the two-sided cavity, wherein the third three-sided cavity is adapted to allow an end portion of a fastener to extend therein and an opposing head portion of the fastener to make contact with the mounting substrate; and
       a plurality of fins adjacent to and/or on top of said slots for removing heat generated by said light emitting devices;
    an active cooling device connected to the heatsink assembly; and
    at least one light emitting device.

20. The system of claim 19 wherein said light emitting device comprises a plurality of light emitting diodes (LEDs).

21. The system of claim 19 wherein at least one of said LEDs is a star LED.

22. The system of claim 19 wherein said LED is a COB LED.

23. The system of claim 21 configured for use as an aquarium light.

24. The system of claim 19 configured for use as a grow light or for general lighting.

25. A method comprising:
    forming a heatsink comprising a base containing a plurality of slots adapted to removably secure one or more light emitting devices thereto, said light emitting devices also connected to a mounting substrate, wherein each of said slots has a bottom edge and a cross sectional appearance comprising a lower case "t" configuration or a plus configuration and comprises at least four cavities which include:
       first and second three-sided cavities substantially perpendicular to and contiguous with a two-sided cavity, wherein the first and second three-sided cavities form a nut-capturing cavity; and
       a third three-sided cavity extending beyond the two-sided cavity, wherein the third three-sided cavity is adapted to allow an end portion of a fastener to extend therein and an opposing head portion of the fastener to make contact with the mounting substrate; and
    a plurality of fins adjacent to and/or on top of said slots for removing heat generated by said light emitting devices.

26. The heatsink of claim 1 comprising at least two light emitting devices of varying thicknesses.

27. The heatsink of claim 1 wherein the fastener is a screw having a standard hardware length.

\* \* \* \* \*